United States Patent
Lyons et al.

(10) Patent No.: US 7,472,580 B2
(45) Date of Patent: Jan. 6, 2009

(54) PRESSURE SENSOR

(75) Inventors: Joseph H. Lyons, Wilton, CT (US);
Peter C. Kochersperger, Easton, CT (US); James Walsh, Newtown, CT (US); Rajan Mali, Shelton, CT (US)

(73) Assignee: ASML Holding N.V., Veldhoven (NL)

( * ) Notice: Subject to any disclaimer, the term of this patent is extended or adjusted under 35 U.S.C. 154(b) by 0 days.

(21) Appl. No.: 11/647,575

(22) Filed: Dec. 29, 2006

(65) Prior Publication Data
US 2007/0176121 A1 Aug. 2, 2007

Related U.S. Application Data

(63) Continuation-in-part of application No. 11/321,651, filed on Dec. 30, 2005, now abandoned.

(51) Int. Cl.
*G01B 13/08* (2006.01)
*G01L 7/00* (2006.01)

(52) U.S. Cl. .......................... 73/37.5; 73/700
(58) Field of Classification Search .......... 73/37.5, 73/37.6, 37.7, 37.9, 700
See application file for complete search history.

(56) References Cited

U.S. PATENT DOCUMENTS

| | | | |
|---|---|---|---|
| 2,571,557 A | | 10/1951 | Fortier |
| 2,707,389 A | * | 5/1955 | Fortier .................. 73/37.5 |
| 2,986,924 A | | 6/1961 | Becker |
| 3,026,714 A | | 3/1962 | Evans et al. |
| 3,127,764 A | * | 4/1964 | Hudson ................ 73/37.5 |
| 3,210,987 A | | 10/1965 | Bruns |
| 3,433,408 A | | 3/1969 | Bellman et al. |

(Continued)

FOREIGN PATENT DOCUMENTS

GB 1 399 397 7/1975

(Continued)

OTHER PUBLICATIONS

Burrows, V.R., "The Principles and Applications of Pneumatic Gauging," FWP Journal, Oct. 1976, pp. 31-42.

(Continued)

*Primary Examiner*—Hezron Williams
*Assistant Examiner*—John Fitzgerald
(74) *Attorney, Agent, or Firm*—Sterne, Kessler, Goldstein & Fox P.L.L.C.

(57) ABSTRACT

A vacuum-driven gas gauge proximity sensor for sensing a difference between a reference surface standoff and a measurement surface standoff is disclosed. Unlike existing proximity sensors, the vacuum-driven gas gauge proximity sensor uses a vacuum to reverse the traditional flow of gas through a proximity sensor, such that gas flows inward across measurement and reference standoffs through measurement and reference nozzles. The conditioned ambient gas that is vacuumed into the reference and measurement nozzles flows through reference and measurement channels that are coupled at a junction into a single channel. The single channel is coupled to the vacuum that is used to evacuate the conditioned ambient gas through the proximity sensor. A bridge channel couples the reference and measurement channels. A mass flow sensor along the bridge channel monitors flow rates to detect measurement standoffs that can be used to initiate a control action. A pump-driven liquid flow proximity sensor is also disclosed.

16 Claims, 3 Drawing Sheets

U.S. PATENT DOCUMENTS

| | | | |
|---|---|---|---|
| 3,482,433 A | 12/1969 | Gladwyn | |
| 3,495,442 A * | 2/1970 | Rejsa | 73/37.6 |
| 3,513,688 A * | 5/1970 | Thibault | 73/37.9 |
| 3,545,256 A * | 12/1970 | Beeken | 73/37.5 |
| 3,597,961 A * | 8/1971 | Pinkstaff | 73/37.5 |
| 3,709,027 A * | 1/1973 | Beeken | 73/37.5 |
| 3,792,609 A | 2/1974 | Blair et al. | |
| 3,894,552 A * | 7/1975 | Bowditch | 137/82 |
| 3,942,556 A * | 3/1976 | Wojcikowski | 137/804 |
| 4,041,584 A | 8/1977 | Williamson | |
| 4,059,130 A * | 11/1977 | Cohen | 137/82 |
| 4,142,401 A * | 3/1979 | Wilson | 73/37.5 |
| 4,187,715 A | 2/1980 | Nevitt | |
| 4,348,889 A * | 9/1982 | Haynes et al. | 73/37.7 |
| 4,391,127 A * | 7/1983 | Hawkins | 73/37.7 |
| 4,421,970 A * | 12/1983 | Couch, Jr. | 219/121.56 |
| 4,458,519 A * | 7/1984 | Day et al. | 73/37 |
| 4,550,592 A | 11/1985 | Dechape | |
| 4,583,917 A | 4/1986 | Shah | |
| 4,607,960 A * | 8/1986 | Wulff | 374/7 |
| 4,912,410 A * | 3/1990 | Morley | 324/230 |
| 4,953,388 A | 9/1990 | Barada | |
| 5,022,258 A * | 6/1991 | Wilson | 73/37.5 |
| 5,181,532 A | 1/1993 | Brodfors et al. | |
| 5,184,503 A | 2/1993 | Hancock | |
| 5,317,898 A | 6/1994 | Nemeth | |
| 5,540,082 A | 7/1996 | Okuyama et al. | |
| 5,789,661 A | 8/1998 | Fauqué et al. | |
| 6,152,162 A | 11/2000 | Balazy et al. | |
| 6,978,658 B1 | 12/2005 | Kochersperger | |
| 7,010,958 B2 | 3/2006 | Gajdeczko et al. | |
| 7,017,390 B1 | 3/2006 | Vogel | |
| 7,021,119 B2 | 4/2006 | Violette | |
| 7,021,120 B2 | 4/2006 | Carter et al. | |
| 7,021,121 B2 | 4/2006 | Ebert et al. | |
| 7,124,624 B2 | 10/2006 | Gajdeczko et al. | |
| 7,134,321 B2 | 11/2006 | Galburt et al. | |
| 2004/0118184 A1 * | 6/2004 | Violette | 73/37.5 |
| 2005/0044963 A1 | 3/2005 | Lyons | |
| 2006/0016247 A1 * | 1/2006 | Galburt et al. | 73/37.5 |

FOREIGN PATENT DOCUMENTS

JP     57-191507     11/1982

OTHER PUBLICATIONS

Derwent Abstract Accession No. 86-324714/49, SU 1225634 A (Kiev Autom Inst) Apr. 23, 1986.

Pending U.S. Appl. No. 11/321,651, filed Dec. 30, 2005, entitled "Vacuum Driven Proximity Sensor".

* cited by examiner

PRESSURE SENSOR

CROSS REFERENCE TO RELATED APPLICATIONS

This application is a continuation-in-part of U.S. application Ser. No. 11/321,651, filed Dec. 30, 2005, which is incorporated by reference herein in its entirety.

BACKGROUND

1. Field of the Invention

The present invention relates to a pressure sensor comprising a sensor channel system having at least one measurement opening and comprising at least one detector arranged to perform a measurement indicative of the pressure at the at least one measurement openings.

2. Background Information

Many automated manufacturing processes require the sensing of the distance between a manufacturing tool and the product or material surface being worked. In some situations, such as semiconductor lithography, the distance must be measured with accuracy approaching a nanometer.

The challenges associated with creating a proximity sensor of such accuracy are significant, particularly in the context of photolithography systems. In the photolithography context, in addition to being non-intrusive and having the ability to precisely detect very small distances, the proximity sensor can not introduce contaminants or come in contact with the work surface, typically a semiconductor wafer. Occurrence of either situation may significantly degrade or ruin the semiconductor quality.

Different types of proximity sensors are available to measure very small distances. Examples of proximity sensors include capacitance and optical gauges. These proximity sensors have serious shortcomings when used in photolithography systems because physical properties of materials deposited on wafers may impact the precision of these devices. For example, capacitance gauges, being dependent on the concentration of electric charges, can yield spurious proximity readings in locations where one type of material (e.g., metal) is concentrated. Another class of problems occurs when exotic wafers made of non-conductive and/or photosensitive materials, such as Gallium Arsenide (GaAs) and Indium Phosphide (InP), are used. In these cases, capacitance and optical gauges may provide spurious results.

U.S. Pat. No. 4,953,388, entitled Air Gauge Sensor, issued Sep. 4, 1990 to Andrew Barada ("'388 Patent"), and U.S. Pat. No. 4,550,592, entitled Pneumatic Gauging Circuit, issued Nov. 5, 1985 to Michel Deschape ("'592 Patent"), disclose an alternative approach to proximity sensing that uses an air gauge sensor. U.S. Pat. Nos. 4,953,388 and 4,550,592 are incorporated herein by reference in their entireties. These sensors use reference and measurement nozzles to emit an air flow onto reference and measurement surfaces and measure back pressure differences within the sensors to measure the distance between the measurement nozzle and the measurement surface.

Furthermore, principles of pneumatic gauging are discussed in Burrows, V. R., *The Principles and Applications of Pneumatic Gauging*, FWP Journal, October 1976, pp. 31-42, which is incorporated herein by reference in its entirety. An air gauge sensor is not vulnerable to concentrations of electric charges or electrical, optical and other physical properties of a wafer surface. Current semiconductor manufacturing, however, requires that proximity is gauged with high precision on the order of nanometers. Earlier versions of air gauge sensors, however, often do not meet today's lithography requirements for precision.

Air gauges proximity sensors operate on the principle that changes in back pressure of a nozzle close to a surface can be set up to be proportional to changes in the distance to the surface. This process involves supplying pressurized air to the device, and then blowing that air out a nozzle and against the surface to be measured.

The resist used in microlithography are sensitive to the atmospheric environment. Often, the air needs to be specially conditioned in order to keep the resist in the proper chemical state. Additionally, the sensing systems (often interferometers) used to control the stages the wafers ride on can also be very sensitive to the content and temperature of the air they work in. Complex air conditioned supplies are developed to meet these needs inside microlithography equipment. Different wavelengths also require different chemical criteria, which can require altering a sensor's infrastructure.

The gas used within a gas gauge proximity sensor must be carefully conditioned so as not to interfere with the chemical or sensing systems. Maintaining the chemical and thermal properties of the gas can be difficult. Similar considerations and operational challenges impact proximity sensors used within immersion lithography systems.

What are needed are systems and methods for diminishing the challenges associated with maintaining the chemical and thermal properties of the gas or liquid used within a gas gauge or liquid flow proximity sensor.

SUMMARY

In one embodiment of the present invention, there is provided a pressure sensor comprising a sensor channel system and a flow device. The sensor channel system has a measurement opening and comprises a detector arranged to perform a measurement indicative of a pressure at the measurement opening. The flow device is configured to create a fluid flow into the sensor channel system via the measurement opening.

In one example, the pressure sensor does not introduce a fluid into the environment to be measured, but extracts fluid from it via one or more measurement openings. Since no fluid is introduced in the environment, no complicated control means are required. Pressure variations beyond the measurement opening and in the environment of the pressure sensor cause pressure variations downstream, which are picked up by the detector.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements.

DETAILED DESCRIPTION

Figure 1:
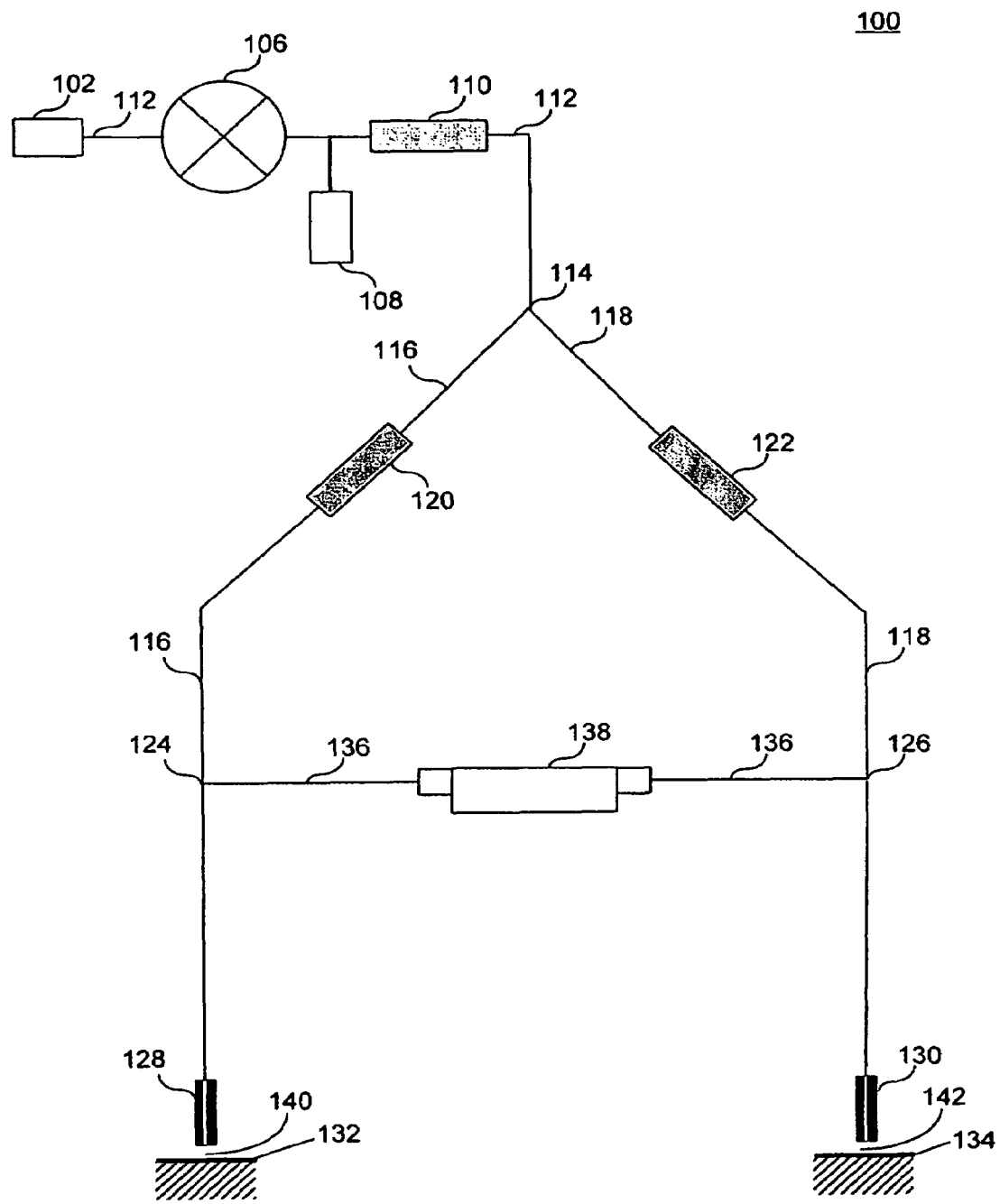
FIG. 1 is a diagram of a proximity sensor, according to an embodiment of the present invention.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Co-pending, commonly owned U.S. patent application Ser. No. 10/322,768 (now U.S. Pat. No. 7,010,958), entitled High Resolution Gas Gauge Proximity Sensor, filed Dec. 19, 2002 by Gajdeczko et al., ("the '768 Patent Application") describes a high precision gas gauge proximity sensor that overcomes some of the precision limitations of earlier air gauge proximity sensors. The precision limitations are overcome by the introduction of porous snubbers to reduce turbulence in the flow of gases and thereby increase precision. The '768 patent Application, which is incorporated herein by reference in its entirety, describes a gas gauge proximity sensor that provides a high degree of accuracy.

Similarly, co-pending, commonly owned U.S. patent application Ser. No. 10/683,271 (now U.S. Pat. No. 7,021,119), entitled Liquid Flow Proximity Sensor for Use in Immersion Lithography, filed Oct. 14, 2003, by Violette, Kevin, ("the '271 Patent Application") describes a high precision immersion lithography proximity sensor that provides a high degree of precision in an immersion lithography application. The '271 patent Application is incorporated herein by reference in its entirety.

Co-pending, commonly owned U.S. patent application Ser. No. 10/646,720, entitled High Resolution Gas Gauge Proximity Sensor, filed Aug. 25, 2003, by Joseph Lyons, ("the '720 Patent Application"), describes a proximity sensor in which a specialized nozzle is used to further increase precision and eliminate areas of insensitivity on a measurement surface during measurement operation. The '720 Patent Application is incorporated herein by reference in its entirety.

A source of imprecision in proximity sensors are external disturbances. In particular with respect to immersion lithography, when liquid flow proximity sensors use a steady flow of fluid, this may lead to contamination and thermal conditioning. Furthermore, proximity sensors used in immersion lithography can be sensitive to low frequency external acoustical interference and sensor offset errors. Co-pending, commonly owned U.S. patent application Ser. No. 10/894,028 (now U.S. Pat. No. 7,134,321), entitled Fluid Gauge Proximity Sensor and Method of Operating Same Using a Modulated Fluid Flow, filed Jul. 20, 2004, by Galburt et al., ("the '028 Patent Application") describes a fluid flow proximity sensor that includes a source of modulated unidirectional or alternating fluid flow that can be modulated at a particular frequency to address the above operating challenges. The '028 Patent Application is incorporated herein by reference in its entirety.

External acoustical interference can also impact gas gauge proximity sensors. Co-pending, commonly owned U.S. patent application Ser. No. 10/854,429 (now U.S. Pat. No. 7,021,121) entitled Gas Gauge Proximity Sensor with a Modulated Gas Flow, filed May 27, 2004, by Ebert et al., ("the '429 Patent Application") describes a gas gauge proximity sensor that modulates a gas stream at a modulated frequency in which there is minimal acoustical interference energy, thereby improving measurement precision. The '429 Patent Application is incorporated herein by reference in its entirety.

While the sensors disclosed in the '768, '271, '720, '028, and '429 patent applications provide a high degree of precision, the precision can be impacted by changes in local environmental conditions near measurement and reference nozzles. In one circumstance, even though the nozzles are often very close together minor differences in environmental conditions can impact sensor accuracy. Co-pending, commonly owned U.S. patent application Ser. No. 10/833,249 (now U.S. Pat. No. 7,021,120) entitled High Resolution Gas Gauge Proximity Sensor, filed Apr. 28, 2004, by Carter et al., ("the '249 Patent Application") describes a gas gauge proximity sensor that includes a chamber that reduces environmental differences across measurement and references nozzles. The '249 Patent Application is incorporated herein by reference in its entirety.

A similar problem relates to cross flows of gas or liquid that intersect the stream of gas or liquid that is being emitted from a measurement channel of the proximity sensor. Specifically, purging gases, for example, can exhibit local cross winds with velocities of the order of a few meters per second. Crosswinds or cross-flows will cause gauge instability and drift, introducing non-calibratable errors within proximity sensors. Co-Pending, commonly owned U.S. patent application Ser. No. 11/005,246 (now U.S. Pat. No. 7,017,390), entitled Proximity Sensor Nozzle Shroud with Flow Curtain, filed Dec. 7, 2004, by Herman Vogel ("the '246 Patent Application") describes a proximity sensor that includes a shroud around the nozzles to reduce the impact on cross winds. The '246 Patent Application is incorporated herein by reference in its entirety.

Proximity sensors must be non-intrusive. Contact between a proximity sensor and a work surface can significantly degrade or ruin the quality of a semiconductor forming the work surface. However, to ensure the greatest level of precision often the measurement nozzle must be extremely close to the work surface. In certain circumstances, as higher levels of precision are required, the movement of a wafer stage or other work platform is such that it is desirable to move a proximity sensor toward and away from a work surface. This leads to another source of imprecision related to the mechanical stability of a proximity sensor head, when it is moved up and down toward the work substrate. When the sensor head is extended it can drift thereby reducing the accuracy of the proximity sensor. U.S. patent application Ser. No. 11/015,652 (U.S. Pat. No. 6,978,658), entitled Proximity Sensor with Self Compensation for Mechanism Instability, filed Dec. 20, 2004, by Peter Kochersperger, ("the '652 Patent Application") discloses a retractable proximity sensor that includes a self compensating mechanism to reduce the impact of proximity sensor head drift on the accuracy of the proximity sensor. The '652 application is incorporate by reference herein in its entirety.

As indicated above the gas used within a gas gauge proximity sensor must be carefully conditioned so as not to interfere with the chemical or sensing systems. Maintaining the chemical and thermal properties of the gas can be difficult. Similar considerations and operational challenges impact proximity sensors used within immersion lithography systems. This leads to another source of imprecision related to the maintenance of the chemical and thermal properties of the gas or liquid within the proximity sensor. The present invention addresses this operational challenge.

To demonstrate the differences with known gas gauge proximity sensors, FIG. 1 provides a diagram of a known gas gauge proximity sensor 100. Gas gauge proximity sensor 100 is one type of proximity sensor that can be improved through use of the present invention, and is not intended to limit the scope of the invention. Gas gauge proximity sensor 100 includes mass flow controller 106, central channel 112, measurement channel 116, reference channel 118, measurement channel restrictor 120, reference channel restrictor 122, measurement probe 128, reference probe 130, bridge channel 136 and mass flow sensor 138. Gas supply 102 injects gas at a desired pressure into gas gauge proximity sensor 100.

Central channel 112 connects gas supply 102 to mass flow controller 106 and then terminates at junction 114. Mass flow controller 106 maintains a constant flow rate within gas gauge proximity sensor 100. Gas is forced out from mass flow controller 106 through a porous snubber 110, with an accumulator 108 affixed to channel 112. Snubber 110 reduces gas turbulence introduced by the gas supply 102, and its use is optional. A more complete description of snubber 110 can be found in the '249 Patent Application. Upon exiting snubber 110, gas travels through central channel 112 to junction 114. Central channel 112 terminates at junction 114 and divides into measurement channel 116 and reference channel 118. Mass flow controller 106 injects gas at a sufficiently low rate to provide laminar and incompressible fluid flow throughout the system to minimize the production of undesired pneumatic noise. Likewise, the system geometry can be appropriately sized to maintain the laminar flow characteristics established by mass flow controller 106.

Bridge channel 136 is coupled between measurement channel 116 and reference channel 118. Bridge channel 136 connects to measurement channel 116 at junction 124. Bridge channel 136 connects to reference channel 118 at junction 126. In one example, the distance between junction 114 and junction 124 and the distance between junction 114 and junction 126 are equal.

All channels within gas gauge proximity sensor 100 permit gas to flow through them. Channels 112, 116, 118, and 136 can be made up of conduits (tubes, pipes, etc.) or any other type of structure that can contain and guide gas flow through sensor 100. It is preferred that the channels do not have sharp bends, irregularities or unnecessary obstructions that may introduce pneumatic noise, for example, by producing local turbulence or flow instability. The overall lengths of measurement channel 116 and reference channel 118 can be equal or in other examples can be unequal.

Reference channel 118 terminates into reference nozzle 130. Likewise, measurement channel 116 terminates into measurement nozzle 128. Reference nozzle 130 is positioned above reference surface 134. Measurement nozzle 128 is positioned above measurement surface 132. In the context of photolithography, measurement surface 132 is often a semiconductor wafer, stage supporting a wafer, flat panel display, a print head, a micro- or nanofluidic device or the like. Reference surface 134 can be a flat metal plate, but is not limited to this example. Gas injected by gas supply 102 is emitted from each of the nozzles 128, 130 and impinges upon measurement surface 132 and reference surface 134. As stated above, the distance between a nozzle and a corresponding measurement or reference surface is referred to as a standoff.

Measurement channel restrictor 120 and reference channel restrictor 122 serve to reduce turbulence within the channels and act as a resistive element. In other embodiments, other types of resistive elements, such as, orifices can be used. Although orifices will not reduce turbulence.

In one embodiment, reference nozzle 130 is positioned above a fixed reference surface 134 with a known reference standoff 142. Measurement nozzle 128 is positioned above measurement surface 132 with an unknown measurement standoff 140. The known reference standoff 142 is set to a desired constant value representing an optimum standoff. With such an arrangement, the backpressure upstream of the measurement nozzle 128 is a function of the unknown measurement standoff 140; and the backpressure upstream of the reference nozzle 130 is a function of the known reference standoff 142. If standoffs 140 and 142 are equal, the configuration is symmetrical and the bridge is balanced. Consequently, there is no gas flow through bridging channel 136. On the other hand, when the measurement standoff 140 and reference standoff 142 are different, the resulting pressure difference between the measurement channel 116 and the reference channel 118 induces a flow of gas through mass flow sensor 138.

Mass flow sensor 138 is located along bridge channel 136, preferably at a central location. Mass flow sensor 136 senses gas flows induced by pressure differences between measurement channel 116 and reference channel 118. These pressure differences occur as a result of changes in the vertical positioning of measurement surface 132. For a symmetric bridge, when measurement standoff 140 and reference standoff 142 are equal, the standoff is the same for both of the nozzles 128, 130 compared to surfaces 132, 134. Mass flow sensor 138 will detect no mass flow, since there will be no pressure difference between the measurement and reference channels. Differences between measurement standoff 140 and reference standoff 142 will lead to different pressures in measurement channel 116 and reference channel 118. Proper offsets can be introduced for an asymmetric arrangement.

Mass flow sensor 138 senses gas flow induced by a pressure difference or imbalance. A pressure difference causes a gas flow, the rate of which is a unique function of the measurement standoff 140. In other words, assuming a constant flow rate into gas gauge 100, the difference between gas pressures in the measurement channel 116 and the reference channel 118 is a function of the difference between the magnitudes of standoffs 140 and 142. If reference standoff 142 is set to a known standoff, the difference between gas pressures in the measurement channel 116 and the reference channel 118 is a function of the size of measurement standoff 140 (that is, the unknown standoff between measurement surface 132 and measurement nozzle 128).

Mass flow sensor 138 detects gas flow in either direction through bridge channel 136. Because of the bridge configuration, gas flow occurs through bridge channel 136 only when pressure differences between channels 116, 118 occur. When a pressure imbalance exists, mass flow sensor 138 detects a resulting gas flow, and can initiate an appropriate control function. Mass flow sensor 138 can provide an indication of a sensed flow through a visual display or audio indication. Alternatively, in place of a mass flow sensor, a differential pressure sensor may be used. The differential pressure sensor measures the difference in pressure between the two channels, which is a function of the difference between the measurement and reference standoffs.

Proximity sensor 100 is provided as one example of a device with a nozzle that can benefit from the present invention. The invention is not intended to be limited to use with only proximity sensor 100. Rather the invention can be used with other types of proximity sensors, such as, for example, the proximity sensors disclosed in the '388 and '592 Patent, and the '768, '271, '720, '028, '429, '249, '286, and '652 Patent Applications.

Figure 2:
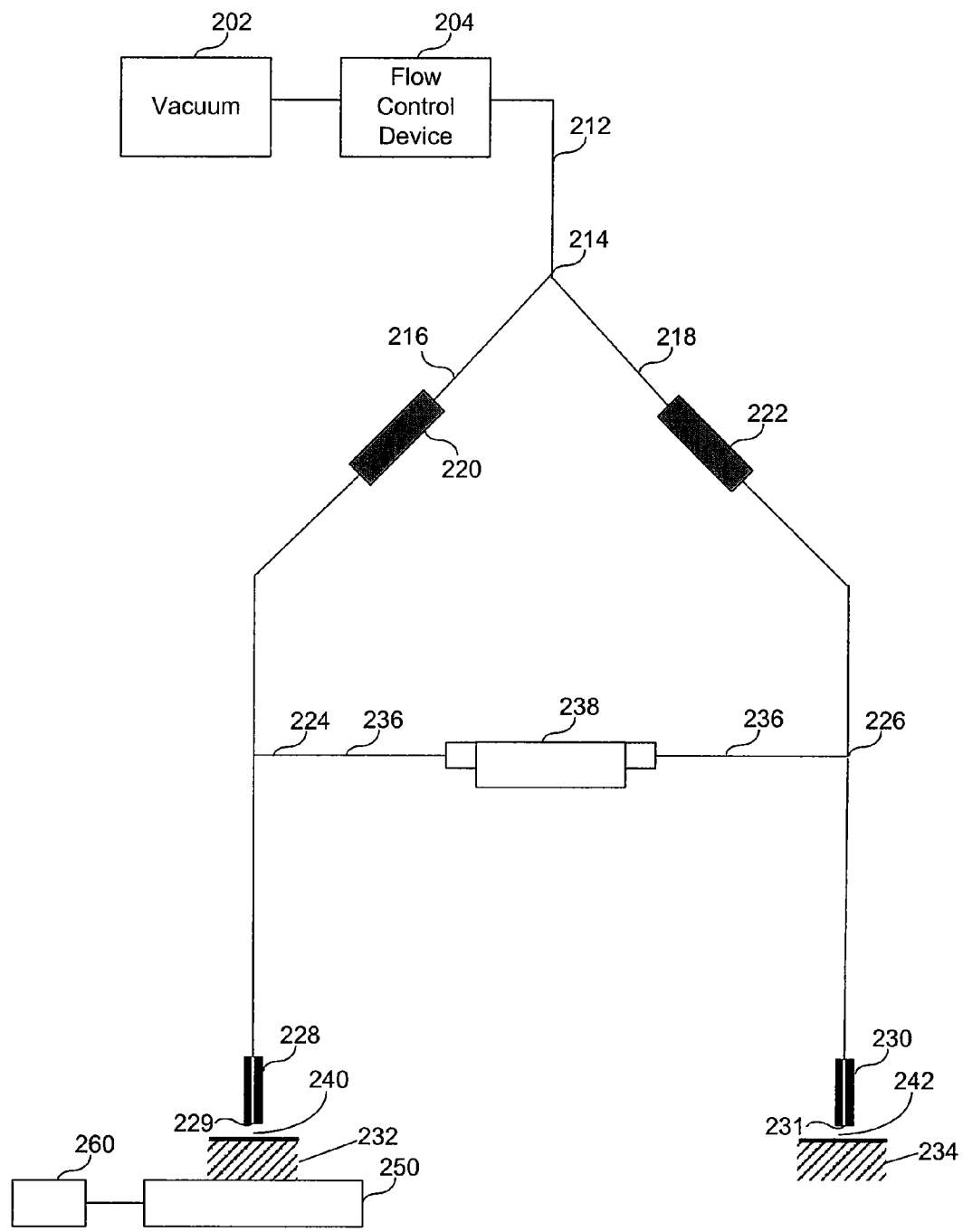
FIG. 2 is a diagram of a vacuum driven gas proximity sensor, according to an embodiment of the invention.

FIG. 2 is a diagram of a pressure sensor used as a proximity sensor (also referred to as gas gauge proximity sensor) 200, according to an embodiment of the invention. Unlike existing proximity sensors, gas gauge proximity sensor 200 uses a vacuum to reverse the traditional flow of gas through a proximity sensor, such that gas flows inward across measurement and reference standoffs through measurement and reference nozzles. Additionally, proximity sensor 200 can be used in a variety of devices, including, but not limited to, a lithography apparatus. For example, proximity sensor 200 can be used in a leveling system of a lithographic projection apparatus. Such a leveling system brings a working surface or substrate into the focal plane of a projection lens of the lithographic projection apparatus. In this implementation, proximity sensor 200 can be used to sense the proximity of the working surface to the sensor to adjust the height of the leveling system.

Gas gauge proximity sensor 200 includes vacuum 202, flow control device 204, central channel 212, measurement channel 216, reference channel 218, measurement probe 228, reference probe 230, bridge channel 236 and mass flow sensor 238. Vacuum 202 evacuates gas at a desired pressure through gas gauge proximity sensor 200. In an embodiment, vacuum 202 maintains a pressure of about 10 pounds per square inch. Desired pressure will be a function of the precision needed and the type of materials and working conditions, as will be know by individuals skilled in the relevant arts based on the teachings herein. The skilled person will appreciate that vacuum 202 and flow control device 204 form flow means arranged to create a fluid flow into the sensor channel system.

By using vacuum 202 to evacuate gas, instead of using gas supply 102 to inject gas into the system provides better control, and does not induce a source of gas into the conditioned ambient gas that surrounds the work area near measurement probe 228 and reference probe 230. As such, the precision of a proximity sensor can be increased by ensuring consistent ambient gas conditions. Channels 216 and 218 include restrictors 220 and 222, respectfully, which are described in detail below.

Central channel 212 connects vacuum 202 to flow control device 204 and then terminates at junction 214. Flow control device 204 maintains a constant flow rate within gas gauge proximity sensor 200. Gas is received by flow control device 204 from central channel 212. Central channel 212 terminates at junction 214 and divides into measurement channel 216 and reference channel 218. Vacuum 202 evacuates gas at a sufficiently low rate to provide laminar and incompressible fluid flow throughout the system to minimize the production of undesired pneumatic noise. Likewise, the system geometry can be appropriately sized to maintain the laminar flow characteristics established by flow control device 204.

Bridge channel 236 is coupled between measurement channel 216 and reference channel 218. Bridge channel 236 connects to measurement channel 216 at junction 224. Bridge channel 236 connects to reference channel 218 at junction 226. In one example, the distance between junction 214 and junction 224 and the distance between junction 214 and junction 226 are equal.

All channels within gas gauge proximity sensor 200 permit gas to flow through them. Channels 212, 216, 218, and 236 can be made up of conduits (tubes, pipes, etc.) or any other type of structure that can contain and guide gas flow through sensor 200. It is preferred that the channels do not have sharp bends, irregularities or unnecessary obstructions that may introduce pneumatic noise, for example, by producing local turbulence or flow instability. The overall lengths of measurement channel 216 and reference channel 218 can be equal or in other examples can be unequal.

Reference channel 218 terminates into reference probe 230 having a reference opening 231. Likewise, measurement channel 216 terminates into measurement probe 228 having a measurement opening 229. Reference probe 230 is positioned such that the reference surface 234 faces the reference opening. Measurement probe 228 is positioned such that the measurement surface 232 faces the measurement opening. In the context of photolithography, measurement surface 232 is often a semiconductor wafer, stage supporting a wafer, flat panel display, a print head, a micro- or nanofluidic device or the like. Reference surface 234 can be a flat metal plate, but is not limited to this example. Gas evacuated through proximity sensor 200 is pulled in through each of the probes 228, 230. As stated above, the distance between a probe and a corresponding measurement or reference surface is referred to as a standoff.

Measurement channel restrictor 220 and reference channel restrictor 222 serve to reduce turbulence within the channels and act as a resistive element. Measurement channel restrictors 220 and reference channel restrictor 222 can be porous restrictors as described in the '768 patent application. In other embodiments, restrictive elements, such as, orifices can be used. However, orifices will not reduce turbulence.

In one embodiment, reference nozzle 230 is positioned above a fixed reference surface 234 with a known reference standoff 242. Measurement probe 228 is positioned above measurement surface 232 with an unknown measurement standoff 240. The known reference standoff 242 is set to a desired constant value representing an optimum standoff. With such an arrangement, the backpressure upstream of the measurement nozzle 228 is a function of the unknown measurement standoff 240; and the backpressure upstream of the reference nozzle 230 is a function of the known reference standoff 242. If standoffs 240 and 242 are equal, the configuration is symmetrical and the bridge is balanced. Consequently, there is no gas flow through bridging channel 236. On the other hand, when the measurement standoff 240 and reference standoff 242 are different, the resulting pressure difference between the measurement channel 216 and the reference channel 218 induces a flow of gas through mass flow sensor 238.

Mass flow sensor 238 is located along bridge channel 236, preferably at a central location. Mass flow sensor 236 senses gas flows induced by pressure differences between measurement channel 216 and reference channel 218. These pressure differences occur as a result of changes in the vertical positioning of measurement surface 232. For a symmetric bridge, when measurement standoff 240 and reference standoff 242 are equal, the standoff is the same for both of the nozzles 228, 230 compared to surfaces 232, 234. Mass flow sensor 238 will detect no mass flow, since there will be no pressure difference between the measurement and reference channels. Differences between measurement standoff 240 and reference standoff 242 will lead to different pressures in measurement channel 216 and reference channel 218. Proper offsets can be introduced for an asymmetric arrangement.

Mass flow sensor 238 senses gas flow induced by a pressure difference or imbalance. A pressure difference causes a gas flow, the rate of which is a unique function of the measurement standoff 240. In other words, assuming a constant flow rate out of gas gauge 200, the difference between gas pressures in the measurement channel 216 and the reference channel 218 is a function of the difference between the magnitudes of standoffs 240 and 242. If reference standoff 242 is set to a known standoff, the difference between gas pressures in the measurement channel 216 and the reference channel 218 is a function of the size of measurement standoff 240 (that is, the unknown standoff between measurement surface 232 and measurement probe 228).

Mass flow sensor 238 detects gas flow in either direction through bridge channel 236. Because of the bridge configuration, gas flow occurs through bridge channel 236 only when pressure differences between channels 216, 218 occur. When a pressure imbalance exists, mass flow sensor 238 detects a resulting gas flow, and can initiate an appropriate control function. Mass flow sensor 238 can provide an indication of a sensed flow through a visual display, audio indication, computer controlled system or other signaling means. Alternatively, in place of a mass flow sensor, a differential pressure sensor may be used. The differential pressure sensor measures the difference in pressure between the two channels, which is a function of the difference between the measurement and reference standoffs.

Proximity sensor 200 is provided as one example embodiment. The invention is not intended to be limited to use with only proximity sensor 200. Rather, for example, the present invention can be applied to a liquid flow proximity sensor, such as the one described in the '271 Application. In that case, the pump-driven liquid flow proximity sensor would be similar to the one described with reference to FIG. 2 with the exception that liquid would be used within the proximity sensor and vacuum 202 would be replaced by a reverse flow device, such as a pump, that would pull liquid through proximity sensor 200 as described above for a gas.

Also, the present invention is not restricted to a mass flow sensor 238, but would work as well with a pressure sensor. For instance, a pressure sensor comprising a membrane that flexes with the pressure difference and of which the flexing is measured, a hot wire anemometer, and the like.

The invention is not intended to be limited to a pump. A skilled artisan will understand that a flow device creating a fluid flow into the sensor channel system via the measurement opening is intended. The skilled artisan will also appreciate that there can be more than one measurement opening, more than on reference opening etc. For example, the bridge can connect one measurement branch with one or more reference branches, but can also connect a single reference branch to one or more measurement branches.

Moreover, the pressure sensor can be comprised in a lithographic apparatus, such as a lithographic projection apparatus to the thickness of a substrate such as a wafer locally. This would be done by placing the substrate with a first side on a substrate table 250 of which the position is continuously monitored by positioner 260, and thereby known relative to the measurement opening 229. The substrate table 250 positions the substrate with a second side, for example, measurement surface 232 facing the measurement opening 229 and the pressure in the measurement opening 229 is measured. This pressure indicates the distance of the second side to the measurement opening. Since the position of the substrate table 250, and therefore the first side of the substrate, is known, the thickness of the substrate can be determined by calculating the distance between the first side and the second side.

Figure 3:
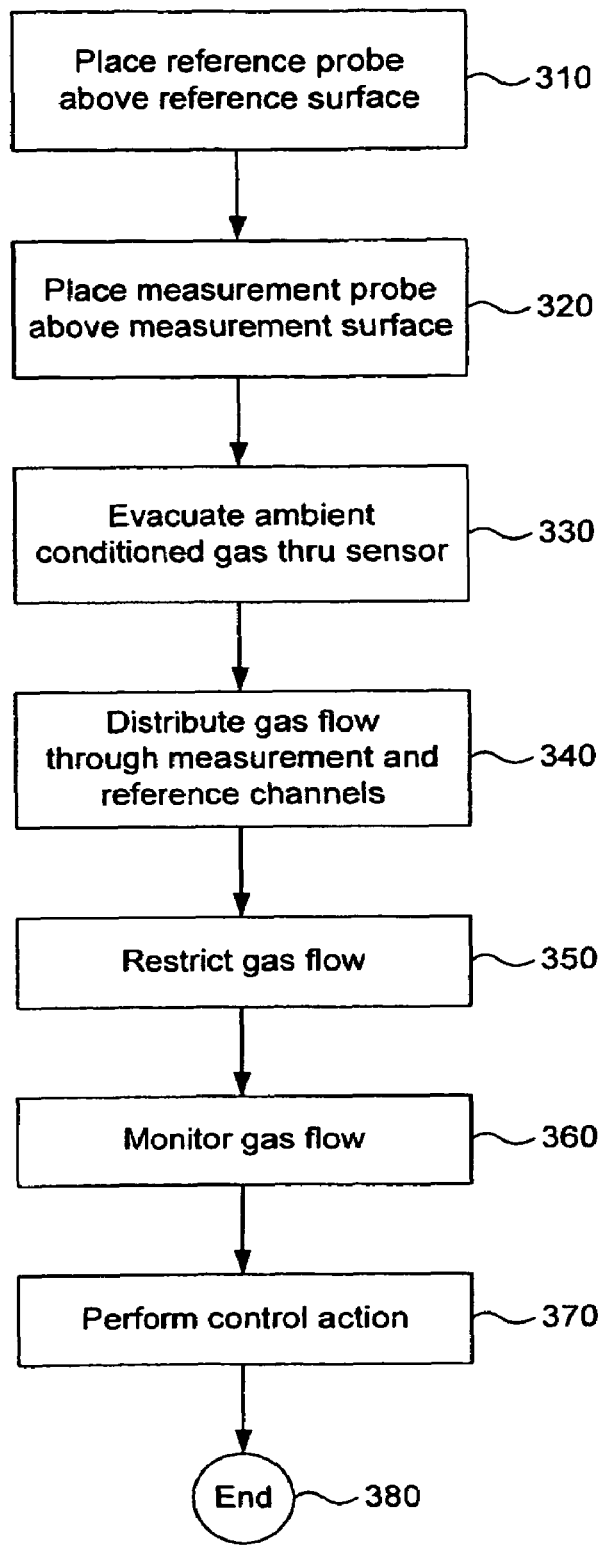
FIG. 3 is a flowchart of a method to detect very small distances using a vacuum-driven proximity sensor, according to an embodiment of the invention.

FIG. 3 presents a method 300 for using a proximity sensor system, such as proximity sensor system 200 to detect very small distances and perform a control action. For convenience, method 300 is described with respect to vacuum-driven proximity sensor 200. However, method 300 is not necessarily limited by the structure of vacuum-driven proximity sensor 200, and can be implemented with a proximity sensor system with a different structure, including but not limited to liquid flow proximity sensor systems.

Method 300 begins in step 310. In step 310, an operator or mechanical device places a reference probe above a reference surface. For example, an operator or mechanical device positions reference probe 230 above reference surface 234 with known reference standoff 242. Alternatively, the reference standoff can be arranged within the sensor assembly, that is, internal to the sensor assembly. The reference standoff is pre-adjusted to a particular value, which typically would be maintained constant.

In step 320, an operator or mechanical device places a measurement probe above a measurement surface. For example, an operator or mechanical device positions measurement probe 228 above measurement surface 232 to form measurement gap 240.

In step 330, gas is evacuated from the ambient conditioned gas that surrounds the measurement and reference probes. For example, vacuum 202 evacuates gas through proximity sensor 200 by vacuuming gas through both reference probe 230 and measurement probe 228. Ambient conditioned gas flows across both reference standoff 242 and measurement standoff 240 into the respective nozzles.

In step 340, gas flow is distributed between measurement and reference channels. For example, gas gauge proximity sensor 200 causes the flow of the measurement gas to be evenly distributed between measurement channel 216 and reference channel 218.

In step 350, gas flow in the measurement channel and the reference channel is restricted evenly across cross-sectional areas of the channels. Measurement channel restrictor 220 and reference channel restrictor 222 restrict the flow of gas to reduce pneumatic noise and serve as a resistive element in gas gauge proximity sensor 200.

In step 360, a flow of gas is monitored through a bridge channel connecting a reference channel and a measurement channel.

In step 370, a control action is performed based on a pressure difference between the reference and measurement channel. For example, mass flow sensor 238 monitors mass flow rate between measurement channel 216 and reference channel 218. Based on the mass flow rate, mass flow sensor 238 initiates a control action. Such control action may include providing an indication of the sensed mass flow, sending a message indicating a sensed mass flow, or initiating a servo control action to reposition the location of the measurement surface relative to the reference surface until no mass flow or a fixed reference value of mass flow is sensed. In step 380, method 300 ends.

The above method may be adapted to use with a pump-driven liquid flow proximity sensor that uses a pump to evacuate conditioned ambient liquid through a sensor in the same manner as described in method 300 for a vacuum-driven gas proximity sensor.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of method steps illustrating the performance of specified functions and relationships thereof. The boundaries of these method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

The Detailed Description section should primarily be used to interpret the claims. The Summary and Abstract sections may set forth one or more, but not all exemplary embodiments of the present invention as contemplated by the inventor(s), and thus, are not intended to limit claims.

What is claimed is:

1. A pressure sensor, comprising:
a sensor channel system having a measurement opening and comprising a detector arranged to perform a measurement indicative of a pressure at the measurement opening, wherein the measurement opening is surrounded by conditioned ambient fluid; and
a flow device configured to create a fluid flow of the conditioned ambient fluid into the sensor channel system via the measurement opening, wherein fluid flows from the measurement opening to the flow device, and wherein the flow device is configured to maintain a pressure downstream of the detector that is lower than a predetermined pressure.

2. The pressure sensor of claim 1, wherein the flow device comprises
a pump.

3. The pressure sensor of claim 1, wherein the predetermined pressure is ten pounds per square inch.

4. The pressure sensor of claim 1, wherein the fluid flow is a gas flow.

5. The pressure sensor of claim 1, further comprising:
a reference opening; and
wherein the pressure sensor is configured to perform a measurement indicative of a pressure difference between the measurement opening and the reference opening.

6. The pressure sensor of claim 5, further comprising:
a reference surface facing the reference opening.

7. The pressure sensor of claim 5, wherein the sensor channel system comprises:
a measurement branch comprising the measurement opening;
a reference branch comprising the reference opening; and
a bridge located between the measurement branch and the reference branch, wherein the detector is located in the bridge.

8. The pressure sensor of claim 7, wherein the detector comprises a mass flow meter, an anemometer, or a pressure meter.

9. The pressure sensor of claim 7, further comprising:
a junction located between the measurement branch and the reference branch downstream of the bridge and upstream of the flow device.

10. The pressure sensor of the claim 7, further comprising:
a resistive element located downstream of the bridge.

11. A lithographic apparatus, comprising:
a pressure sensor comprising,
a sensor channel system having a measurement opening and comprising a detector arranged to perform a measurement indicative of a pressure at the measurement opening, wherein the measurement opening is surrounded by conditioned ambient fluid, and
a flow device configured to create a fluid flow of the conditioned ambient fluid into the sensor channel system via the measurement opening, wherein fluid flows from the measurement opening to the flow device,
wherein the flow device is configured to maintain a pressure downstream of the detector that is lower than a predetermined pressure.

12. The lithographic apparatus of claim 11, further comprising:
a positioner arranged to give the measurement opening and a substrate that is to be exposed relative positions wherein the substrate faces the measurement opening.

13. A proximity sensor for sensing a difference between a reference surface standoff and a measurement surface standoff surrounded by conditioned ambient fluid, comprising:
a flow device that evacuates the conditioned ambient fluid, wherein the flow device is configured to maintain a downstream pressure that is lower than a predetermined pressure;
a junction that combines fluid flow into a channel coupled to a vacuum in the proximity sensor, wherein the junction combines a reference channel and a measurement channel;
a first resistive element located in the reference channel, wherein said first resistive element restricts fluid flow through the reference channel;
a second resistive element located in the measurement channel, wherein said second resistive element restricts fluid flow through the measurement channel;
a reference probe at an end of the reference channel, whereby fluid enters the reference channel through the reference probe having traveled across the reference surface standoff;
a measurement probe at an end of the measurement channel, whereby fluid enters the measurement channel through the measurement probe having traveled across a measurement surface standoff; and
a sensor coupled between the reference and measurement channels that senses the mass of fluid flow therebetween, whereby, the difference in standoffs between the reference and measurement surfaces can be sensed.

14. The proximity sensor of claim 13, wherein said first and second resistive elements comprise a porous restrictor or orifice.

15. The proximity sensor of claim 13, further comprising a flow control device located between the flow device and the junction, wherein said flow control device provides a laminar flow of fluid throughout the proximity sensor.

16. The proximity sensor of claim 13, wherein the fluid comprises one of a gas or a liquid.

* * * * *